Nov. 21, 1950   H. PATER ET AL   2,530,479
MATCHED EDGE LAWN MOWER GRINDER
Filed Dec. 17, 1948   3 Sheets-Sheet 1
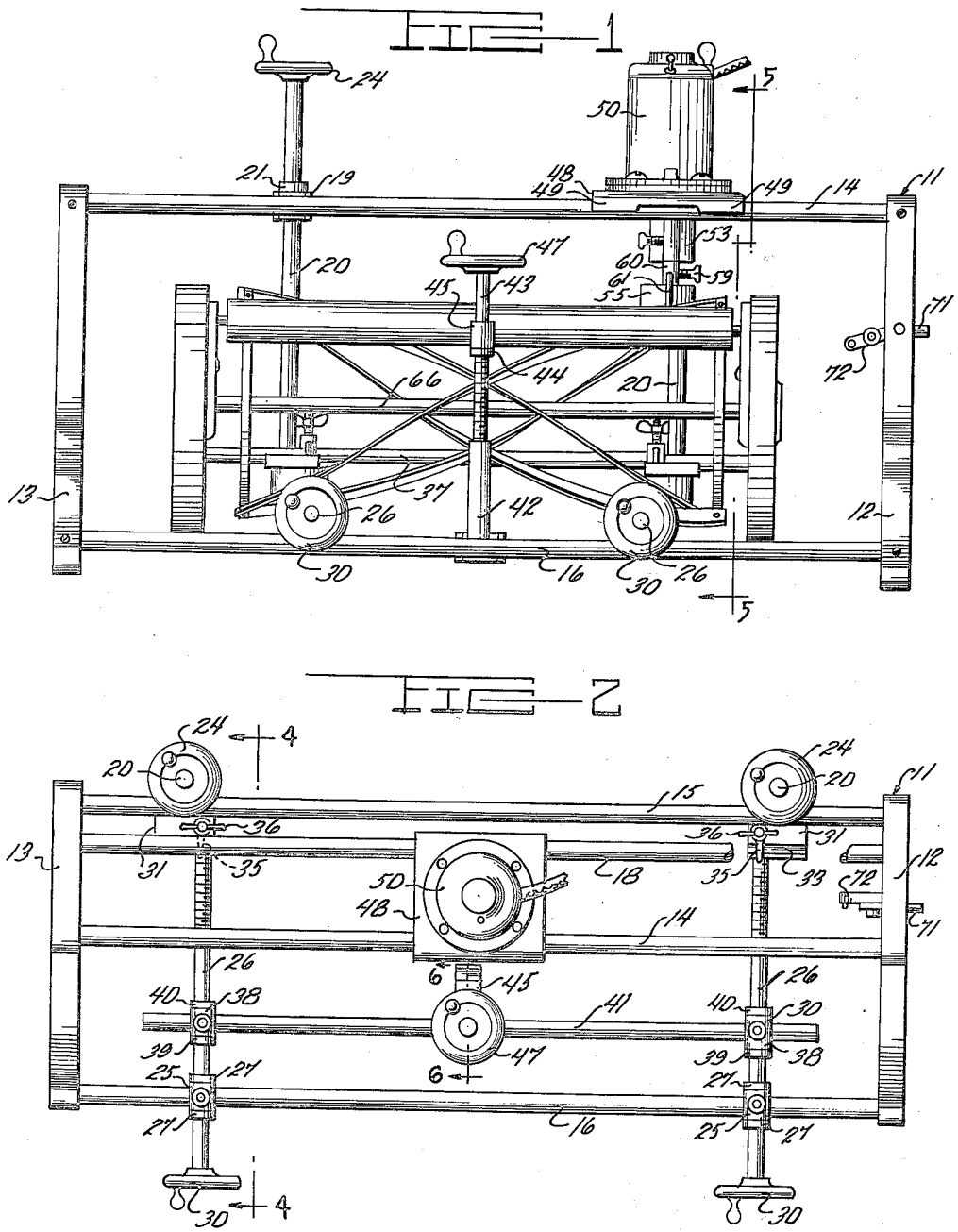
INVENTOR.
FRED BRUCKMEIER & HERMAN PATER
BY
McMorrow, Berman and Davidson
ATTORNEYS

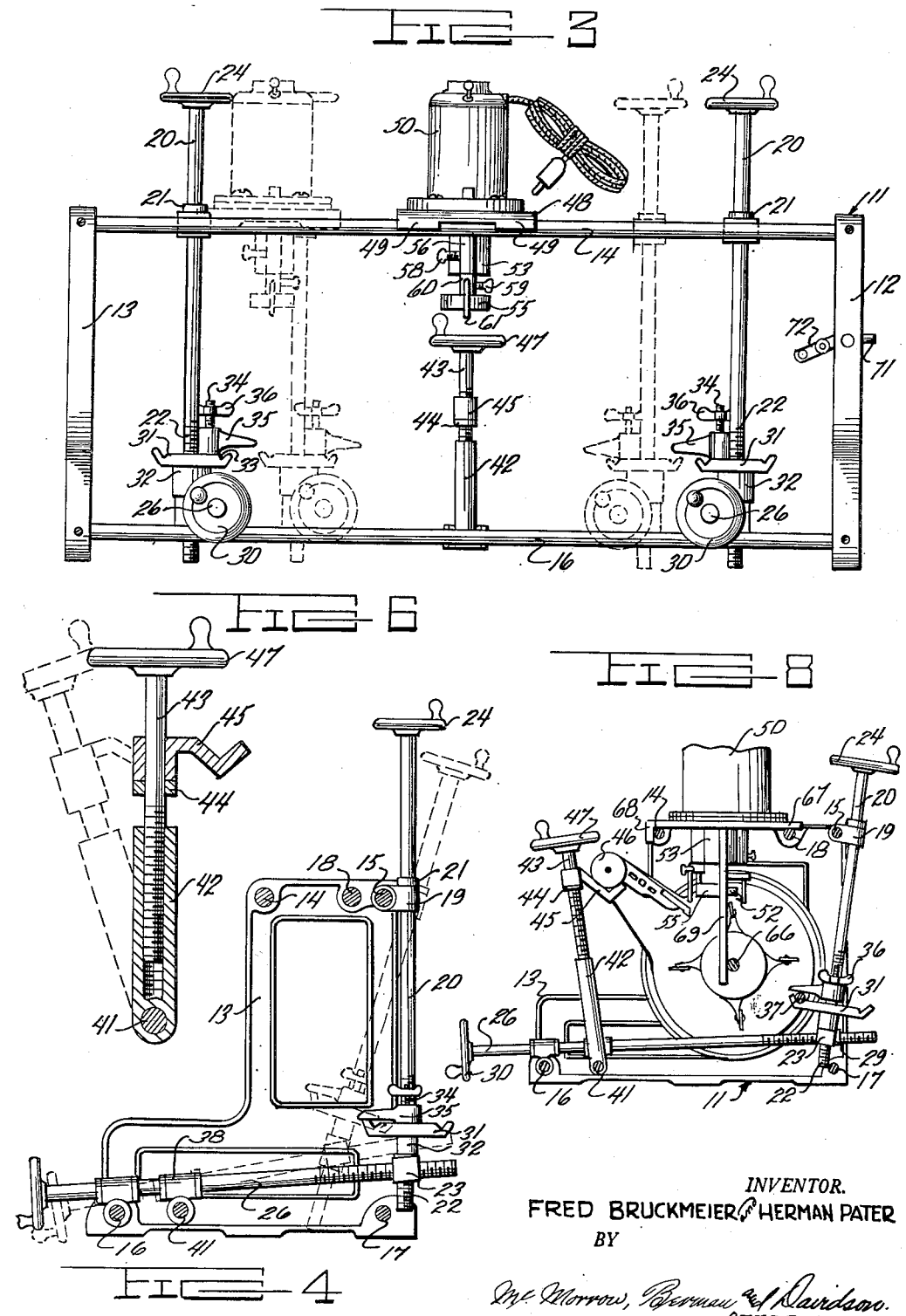

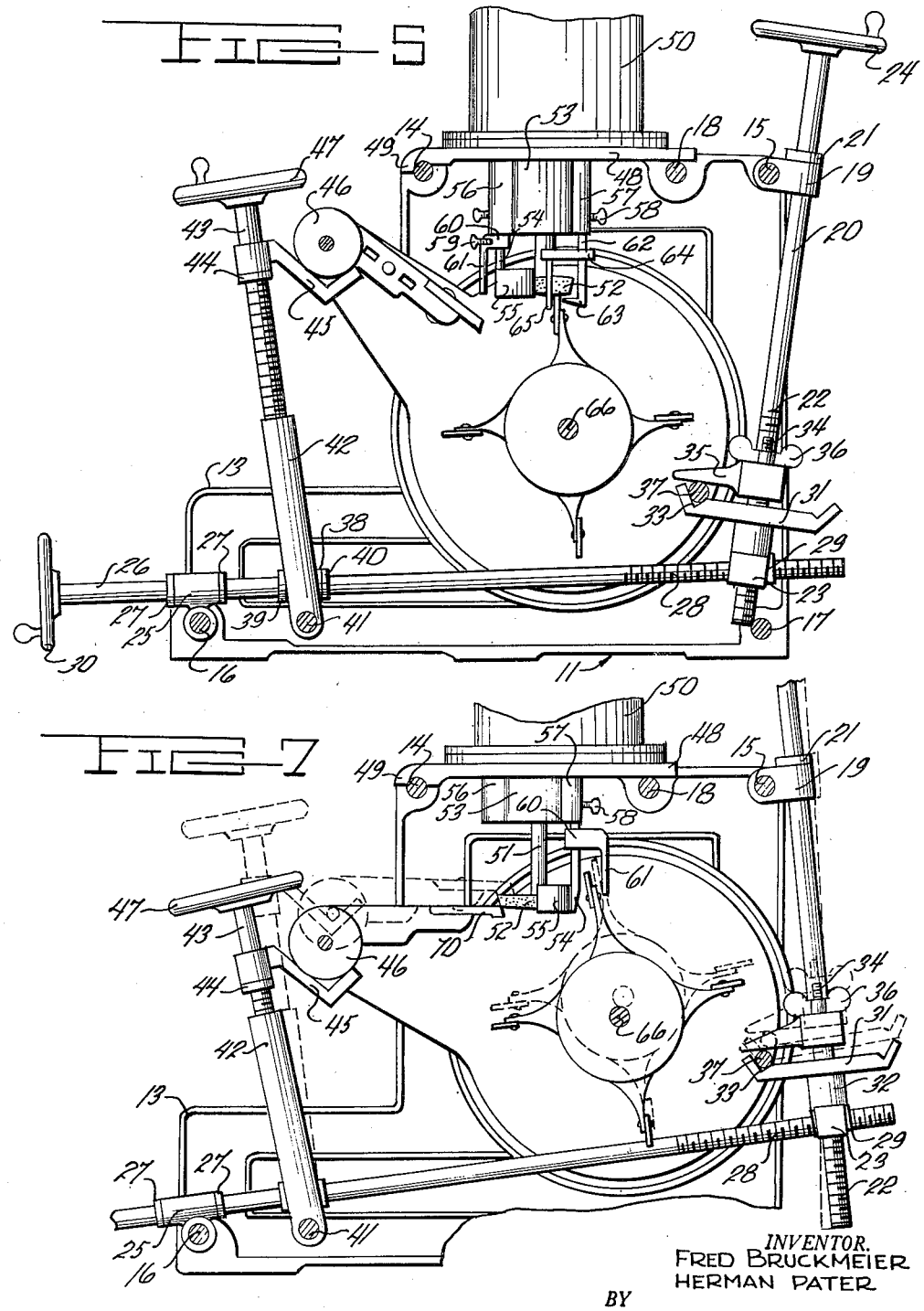

Patented Nov. 21, 1950

2,530,479

UNITED STATES PATENT OFFICE 2,530,479

MATCHED EDGE LAWN MOWER GRINDER

Herman Pater, Waltham, and Fred Bruckmeier, Austin, Minn.

Application December 17, 1948, Serial No. 65,866

3 Claims. (Cl. 51—56)

This invention relates to tool sharpening machines, and more particularly to a lawn mower sharpener.

A main object of the invention is to provide a novel and improved lawn mower sharpening machine which is very simple in construction, easy to operate, and which enables the various cutting edges of a lawn mower, such as the cutting edges of the reel blades and the cutting edge of the bed knife, to be readily sharpened with a minimum expenditure of time and labor.

A further object of the invention is to provide an improved lawn mower sharpener which is relatively compact in size, light in weight, and which enables the various cutting edges of a lawn mower to be sharpened without requiring the removal of any parts from the lawn mower assembly except the handle, said sharpener providing accurately angled cutting edges on the reel blades of the mower and also an accurately angles cutting edge on the bed knife of the mower, matched with the cutting edge angles of the reel blades, whereby optimum efficiency is obtained in the operation of the lawn mower.

Further objects and advantages of the invention will become apparent from the following description and claims, and from the accompanying drawings, wherein:

Figure 1 is a front elevational view of a lawn mower sharpening machine constructed in accordance with the present invention showing a lawn mower assembly operatively positioned therein for sharpening.

Figure 2 is a top plan view of the machine of Figure 1 with the lawn mower assembly omitted.

Figure 3 is a front elevational view similar to Figure 1 but with the lawn mower omitted.

Figure 4 is a vertical cross-sectional view of the machine taken on line 4—4 of Figure 2.

Figure 5 is an enlarged vertical cross-sectional view taken on line 5—5 of Figure 1.

Figure 6 is an enlarged cross-sectional detail view taken on line 6—6 of Figure 2.

Figure 7 is a cross-sectional view similar to Figure 5 but showing the lawn mower arranged for sharpening the bed knife rather than the reel blades thereof.

Figure 8 is a vertical cross-sectional view taken transversely through the sharpening machine with a law mower assembly positioned therein for sharpening and illustrating the gauge means employed for properly locating the reel shaft of the lawn mower with respect to the frame of the sharpening machine.

Referring to the drawings, the frame of the sharpening machine is designated generally at 11. Said frame comprises the vertical side castings 12 and 13 disposed parallel to each other, said castings being connected at their top arms by parallel horizontal rods 14, 15 and 18 and at their bottom arms by parallel horizontal rods 16 and 17. It will be seen from Figures 2 and 4 that the rear rods 15 and 17 are vertically aligned, whereas the forward bottom rod 16 is spaced a substantial distance forwardly with respect to the top forward rod 14. It will also be seen from Figure 4 that top rods 14, 18 and 15 are in the same horizontal plane and that rod 18 is located inwardly adjacent rod 15. The respective rods 14, 15, 18, 16 and 17 have rigid connections at their ends with the respective side castings 12 and 13, providing a rigid supporting frame for the additional components of the machine.

Slidably and rotatably mounted on the top rear rod 15 are a pair of bracket members 19, 19. Designated at 20, 20 are a pair of upstanding shaft members extending rotatably through the respective bracket members 19, 19 and provided with bearing collars 21 overlying said bracket members. The lower portions of the shaft members 20 are formed with screw threads 22. Engaged on said screw threads 22 are the respective nut members 23. The top ends of shaft members 20 are provided with handwheels 24.

Slidably and rotatably mounted on the bottom forward rod 16 are a pair of bracket members 25, 25. Designated at 26, 26 are a pair of shaft members extending rotatably through the bracket members 25, 25 above rod 16, said shaft members being provided with bearing collars 27 forwardly and rearwardly of the bracket members. The rear portions of the shaft members 26 are formed with screw threads 28. Engaged on said screw threads are respective nut members 29. The nut members 29 are each pivotally connected to a nut member 23 so that the pivotally connected nut members 23 and 29 may rotate relative to each other around a horizontal longitudinal axis. The forward ends of shaft members 26 are provided with hand wheels 30.

It will be seen from Figure 5 that the shaft members 20 may be swung forwardly by rotating hand wheels 30 and that the shaft members 26 may be swung upwardly by rotating the handwheels 24.

Rotatably mounted on the respective shaft members 20 are brackets 31 having depending sleeve portions 32 bearing on the nut members 23. The brackets 31 are formed with top grooves 33 adjacent their forward and rear margins. Said brackets carry upstanding studs 34 on which are rotatably mounted respective locking arms 35. Threaded on the studs 34 above the rotatable arms 35 are respective wing nuts 36. As shown in Figures 5, 7 and 8, the front tie bar 37 of the lawn mower to be sharpened is received in the grooves 33 of brackets 31 and is locked therein by rotating the arms 35 transversely over the tie bar and then tightening the wing nuts 36.

Designated at 38, 38 are respective bracket members mounted on the shaft members 26, 26 adjacent the bottom forward frame bar 16. The bracket members 38 are held against axial movement on the shaft members 26 by front and rear stop collars 39 and 40 secured on the shaft members. Secured in the bracket members 38, 38 is a longitudinally extending rod 41. Pivoted to the intermediate portion of rod 41 for rotation around the rod is an arm 42. Threaded axially into the arm 42 is a shaft 43 on which is secured a collar 44. Rotatably mounted on shaft 43 and supported on the collar 44 is an arm 45 formed to define an upwardly facing cradle. As shown in Figures 5, 7 and 8, this cradle is employed to receive the roller 46 of the lawn mower to be sharpened. The end of shaft 43 is provided with a handwheel 47. By rotating handwheel 47 the distance of arm 45 from rod 41 may be regulated.

Designated at 48 is a plate member formed at its forward margin with longitudinally grooved downwardly facing lugs 49, 49 rotatably and slidably engaged on frame rod 14, as shown in Figures 5 and 7. The rear marginal portion of plate member 48 is slidably supported on frame rod 18. Mounted on plate member 48 is an electric motor 50 whose shaft is vertical, as shown at 51, and which extends downwardly through plate member 48. The motor shaft 51 carries at its lower end the grinding wheel 52.

Depending from the plate member 48 around the shaft 51 is a boss 53. Adjustably secured to boss 53 is a depending arm 54 which carries at its lower end an arcuate guard plate 55 disposed adjacent the periphery of the grinding wheel 52.

As shown in Figures 5 and 7, boss 53 is formed with diametrically opposed vertically bored lugs 56 and 57, provided with set screws 58. The guard-supporting arm 54 may be secured either in the vertically bored lug 56, as shown in Figure 5, wherein the guard plate 55 covers the front of grinding wheel 52, or in the lug 57, as shown in Figure 7, wherein the guard plate 55 covers the rear of the grinding wheel.

Adjustably secured on the arm 54, as by a set screw 59 is a collar member 60 formed with a depending finger 61 laterally spaced from the guard plate 55, as shown in Figure 5. When the apparatus is set up as in Figure 5, a depending rod element 62 is secured in lug 57, said rod element being formed with a hook 63 at its lower end. Secured transversely to the intermediate portion of rod element 62 is a horizontal bar 64 which carries a depending vertical finger 65 spaced from the end of hook 63, as shown in Figure 5.

To sharpen a lawn mower, the handle thereof is removed and the lawn mower assembly is placed in inverted position within the frame 11 with the tie bar 37 of the lawn mower received in the grooves 33 of brackets 31 and the roller 46 thereof received in the cradle arm 45, the arm 42 being rotated to the appropriate upstanding position for placing the cradle arm 45 beneath said roller. The shaft of the lawn mower reel, indicated at 66 is brought substantially into vertical alignment with the bottom grinding surface of the grinding wheel 52 in the manner illustrated in Figure 8. As shown in Figure 8, a T-shaped gauge device is employed consisting of a top bar 67 having a marginal depending lug 68 and a central depending vertical arm 69. The top bar 67 is placed on the rods 14 and 18 with lug 68 in abutment with rod 14, as shown. The respective hand wheels 30, 47 and 24 are then rotated until the lawn mower reel has been adjusted to a position wherein shaft 66 abuts the arm 69, and the edge of the top reel blade is just below the grinding wheel. The gauge device is then removed. The hand wheels 24 are then further rotated until the bottom surface of the grinding wheel engages the top reel blade edge in the manner shown in Figure 5. As shown in Figure 5, the top reel blade is located between the finger 65 and the hook 63. The grinding wheel is moved longitudinally as it rotates by sliding the plate member 48 along the frame rods 14 and 18. Finger 65 acts as a work rest and hook 63 rotates the reel by engaging the reel blade being ground as the grinding wheel is moved longitudinally in the frame. The hook 63 and the finger 65 thus cooperate to maintain the blade being ground at a substantially constant angle to the abrading surface of the grinding wheel.

After all the reel blade edges have been ground, as above described, the rod element 62 is removed and arm 54 is taken out of lug 56 and secured in lug 57 in the position shown in Figure 7, wherein guard plate 55 covers the rear of the grinding wheel. The hand wheels 30, 47 and 24 are then adjusted to change the position of the lawn mower so that the grinding wheel may engage one of the cutting edge surfaces of the bed knife, shown at 70, of the mower. As shown in full line view in Figure 7, this adjustment may bring the periphery of the grinding wheel into abrading engagement with the steep edge surface of the bed knife. Said edge surface may then be uniformly ground by moving the motor support plate 48 longitudinally on the frame rods 14 and 18. As shown in Figure 7, the top reel blade is received between arm 54 and finger 61 to control the position of the reel while the bed knife is being sharpened. After the steep edge surface of the bed knife has been completely ground as by moving the grinding wheel thereover one or more times, the horizontal edge surface of the bed knife may be ground by adjusting the hand wheels 30, 47 and 24 to bring the lawn mower to the dotted view position of Figure 7, wherein the horizontal edge surface of the bed knife engages the top surface of the grinding wheel. Said horizontal edge surface may then be ground by moving the motor support plate 48 longitudinally while the rotating grinding wheel abrades the surface, in the same manner as described previously.

Secured to the side casting 12 is a bracket member 71 which is employed as a diamond wheel dressing fixture. Member 71 has adjustably secured thereto the diamond dressing tool holder 72. Holder 72 may be set to three different predetermined positions to dress the three grinding faces of the grinding wheel to their proper angles.

While a specific embodiment of a lawn mower sharpening machine has been disclosed in the foregoing description, it will be understood that various modifications within the spirit of the invention may occur to those skilled in the art.

Therefore, it is intended that no limitations be placed on the invention except as defined by the scope of the appended claims.

What is claimed is:

1. A lawn mower sharpening machine comprising a pair of spaced upstanding frame sides, a pair of guide bars secured to the tops of the frame sides and extending between the frame sides and being substantially parallel and horizontal, the guide bars being disposed at substantially the same elevation, a pivot bar arranged adjacent to the tops of the frame sides and secured thereto and parallel to the guide bars and extending parallel to the guide bars and spaced therefrom, a pair of generally vertical screw shafts pivotally and longitudinally slidably mounted upon the pivot bar and extending near the bottoms of the frame sides, forward and rear bars extending between the bottoms of the frame sides and secured thereto and disposed horizontally at substantially the same elevation, a pair of screw shafts pivotally and longitudinally slidably mounted upon said forward bar and extending generally at right angles to the first-named pair of screw shafts and having their rear ends crossing the first-named pair of screw shafts and terminating adjacent to the rear ends of the frame sides, nuts mounted upon the first and second-named pairs of screw shafts and being pivotally connected, clamp means secured to the first-named pair of screw shafts and extending forwardly thereof, an intermediate substantially horizontal pivot bar arranged between said forward and rear bars and at substantially the elevation thereof, means connecting said intermediate bar and the second-named screw shafts so that the intermediate bar is bodily mounted upon the second-named screw shafts, an upstanding arm arranged between the second-named pair of screw shafts and having its bottom end pivotally mounted upon the intermediate bar, an axially shiftable adjusting screw mounted within the upstanding arm and projecting above the same, a cradle bracket carried by said adjusting screw for movement therewith and spaced forwardly of and between the clamp means, a motor longitudinally slidably mounted upon the guide bars and including a depending vertical armature shaft, a grinding wheel secured to the bottom of the armature shaft and disposed below the guide bars and forwardly of the first-named pair of screw shafts, and guide means mounted upon the motor and projecting below the same for engagement with the lawn mower reel to position such reel with respect to the grinding wheel.

2. A lawn mower sharpening machine comprising a pair of spaced upstanding frame sides, a pair of substantially horizontal parallel guide bars secured to the tops of the frame sides and extending between the frame sides and disposed substantially at the same elevation, a substantially horizontal pivot bar secured to the tops of the frame sides and disposed at substantially the same elevation and parallel to the guide bars and spaced from the guide bars, a pair of laterally spaced substantially vertical screw shafts pivotally mounted upon the pivot shaft and extending below the same and having their bottoms terminating near the bottoms of the frame sides, the screw shafts being disposed near the rear ends of the frame sides, the pair of guide bars being disposed forwardly of the screw shafts, forward and rear substantially horizontal bars secured to the bottoms of the frame sides and extending between the frame sides and arranged at substantially the same elevation, a pair of substantially horizontal screw shafts pivotally mounted upon the forward bar and arranged substantially at right angles to the first-named screw shafts, the rear ends of the substantially horizontal screw shafts crossing the first-named screw shafts and terminating near the rear ends of the upstanding frame sides, nuts pivotally mounted upon the first-named and substantially horizontal screw shafts and being pivotally connected, adjustable clamping devices mounted upon the first-named screw shafts and disposed above the nuts, the adjustable clamping devices being arranged near the rear ends of the upstanding frame sides, a substantially horizontal intermediate shaft mounted upon the substantially horizontal screw shafts and extending between them and disposed substantially at the elevation of said forward and rear bars, an upstanding arm pivotally mounted upon the intermediate shaft substantially mid-way between the clamping devices, a vertically adjustable cradle carried by the upstanding arm and arranged near the forward ends of the upstanding frame sides and forwardly of said guide bars, and a motor longitudinally slidably mounted upon the guide bars and including a depending substantially vertical armature shaft having a grinding wheel secured thereto, said grinding wheel being disposed below the guide bars and forwardly of said pivot bar.

3. A lawn mower sharpening machine comprising a pair of spaced upstanding frame sides, a pair of substantially horizontal laterally spaced guide bars secured to the tops of the frame sides and extending between the same and disposed substantially at the same elevation, a substantially horizontal pivot bar secured to the tops of the frame sides and spaced rearwardly of the guide bars and at substantially the same elevation as the guide bars, a pair of laterally spaced generally vertical screw shafts arranged adjacent to the rear ends of the upstanding frame sides and pivotally mounted upon said pivot bar and extending below the pivot bar and having their bottom ends terminating near the bottoms of the frame sides, forward and rear substantially horizontal bars disposed near the bottoms of the frame sides and connecting the frame sides and arranged at substantially the same elevation, the forward substantially horizontal bar being arranged forwardly of said guide bars, a pair of substantially horizontal screw shafts pivotally mounted upon the forward substantially horizontal bar and disposed at an elevation near the bottoms of the frame sides and near the bottoms of the substantially vertical screw shafts, the rear ends of the substantially horizontal screw shafts terminating near the substantially vertical screw shafts and near the rear ends of the upstanding frame sides, nut means pivotally connecting the rear ends of the substantially horizontal screw shafts and the bottom ends of the substantially vertical screw shafts, adjustable clamps slidably mounted upon the substantially vertical screw shafts and seated upon said nut means for movement therewith along said substantially vertical screw shafts, an intermediate substantially horizontal shaft mounted upon the substantially horizontal screw shafts and arranged between the forward substantially horizontal bar and the guide bars, an upstanding arm pivotally secured to the intermediate substantially horizontal bar between the substantially horizontal screw shafts, a longitudinally adjustable screw carried by the arm, a cradle bracket secured to the screw for movement therewith, and a motor longitudinally slidably mounted upon the guide bars and including a depending substantially vertical armature shaft extending below the guide bars and adapted to have a grinding wheel mounted thereon.

HERMAN PATER.
FRED BRUCKMEIER.

REFERENCES CITED

The following references are of record in the file of this patent:

UNITED STATES PATENTS

| Number | Name | Date |
|---|---|---|
| 847,463 | Busselle et al. | Mar. 19, 1907 |
| 946,635 | Franke | Jan. 18, 1910 |
| 1,657,757 | Krenz | Jan. 31, 1928 |
| 1,967,118 | Glasgow | July 17, 1934 |
| 2,128,023 | Specht et al. | Aug. 23, 1938 |
| 2,142,669 | Carpenter | Jan. 3, 1939 |
| 2,264,918 | Smith et al. | Dec. 2, 1941 |
| 2,441,045 | Toepfer | May 4, 1948 |